United States Patent
Woo et al.

(10) Patent No.: US 8,327,045 B1
(45) Date of Patent: *Dec. 4, 2012

(54) SYSTEM AND METHOD FOR STORING COMMUNICATIONS INTENDED FOR DIFFERENT GROUPS USING A LIMITED AMOUNT OF SPACE

(75) Inventors: Alec Woo, Union City, CA (US); David E. Culler, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,379

(22) Filed: May 7, 2012

Related U.S. Application Data

(63) Continuation of application No. 12/002,612, filed on Dec. 17, 2007, now Pat. No. 8,176,223.

(51) Int. Cl.
G06F 3/00 (2006.01)
G06F 5/00 (2006.01)
G06F 13/12 (2006.01)
G06F 13/38 (2006.01)

(52) U.S. Cl. .......................................... 710/52; 710/74

(58) Field of Classification Search .................... None
See application file for complete search history.

(56) References Cited

U.S. PATENT DOCUMENTS

| 6,992,991 B2 * | 1/2006 | Duske et al. ................... 370/316 |
| 7,415,243 B2 * | 8/2008 | Yuhara et al. ................. 455/12.1 |
| 2004/0249977 A1 * | 12/2004 | Minamisawa ................. 709/245 |

OTHER PUBLICATIONS

Non-final Office Action from U.S. Appl. No. 11/698,358, mailed Apr. 24, 2009 (17 pages).
Non-final Office Action from U.S. Appl. No. 11/698,334, mailed Oct. 28, 2009 (10 pages).
Popescu and Liu, "Stateless application-level multicast for dynamic group communication", Proceedings of the Eighth IEEE International Symposium on Distributed Simulation and Real-Time Applications (DS-RT'04), 1550-6525/04, 2004 (9 pages).
Parvathipuram, Kumar and Yang, "An Efficient Leader Election Algorithm for Mobile Ad Hoc Networks", ICDCIT 2004, LNCS 3347, pp. 32-40, 2004 (10 pages).

* cited by examiner

*Primary Examiner* — Chun-Kuan Lee
*Assistant Examiner* — Zachary K Huson
(74) *Attorney, Agent, or Firm* — Fish & Richardson P.C.

(57) ABSTRACT

A system and method stores wirelessly received communications for wireless retransmission, making space in a storage device, if necessary, by deleting any one or more communications corresponding to the same group as the received communication. If storage in the storage device remains insufficient, communications that have been previously retransmitted by that same device are deleted, according to one or more characteristics of such stored communications, such as age or number of times an instance of that communication has been received. If storage in the storage device remains insufficient, communications of a different group are deleted according to one or more characteristics of the stored communications.

20 Claims, 4 Drawing Sheets

SYSTEM AND METHOD FOR STORING COMMUNICATIONS INTENDED FOR DIFFERENT GROUPS USING A LIMITED AMOUNT OF SPACE

CROSS REFERENCE TO RELATED APPLICATIONS

This application is a continuation application of and claims priority to U.S. application Ser. No. 12/002,612, filed Dec. 17, 2007, entitled "System and Method for Storing Communications Intended for Different Groups Using a Limited Amount of Space." Further, this application is related to U.S. application Ser. No. 11/698,358, filed Jan. 26, 2007, entitled "System and Method for Sending and Receiving Scalable Acknowledgments" and U.S. application Ser. No. 11/698,334, filed Jan. 26, 2007, entitled "System and Method for Receiving and Sending Scalable Acknowledgments". Each of the above-referenced applications are incorporated herein by reference in their entirety.

FIELD OF THE INVENTION

The present invention is related to computer software and more specifically to computer software for wireless devices with limited memory.

BACKGROUND OF THE INVENTION

The related applications describe an arrangement whereby wireless devices are divided into groups of devices. Each group is assigned a lieutenant, the devices in the groups provide acknowledgements to communications to the lieutenant for the group, and the lieutenant forwards a report of the acknowledgements it has or has not received. The devices may receive communications from their respective lieutenants or from other devices.

There may be other reasons that devices are grouped. In the event that some communications may be commands, each device may be assigned as a device that is to perform only certain commands, or the device may be only capable of performing some commands but not others. To facilitate the performance of only certain commands, commands may be sent with one or more group identifiers, and each device performs the commands corresponding to a group identifier of that device. The group identifier corresponding to the device may be part of the device, for example, being stored in ROM, or it may be dynamically assigned and reassigned as needed.

As described in the related applications, each device receiving a communication rebroadcasts the communication to the other devices in range of that device, allowing devices to receive a communication even if they are not in range of the device that sent the communication.

It may be desirable to allow devices to receive and rebroadcast communications that are not for the group to which the device is assigned. In this manner, the range of communications is extended for all devices.

It may also be desirable for a device to request the most recent communication for the group to which that device is assigned. The other devices in the same group can store the most recently received communication or communications for the group and rebroadcast it in response to such a request. In this manner, a device that does not receive a communication within an expected period of time can send such a request and receive the communication.

However, there is a problem with this approach. To be able to respond to such a request from devices assigned to groups other than the group to which the device receiving the request is assigned, that device must store the communications for all of the groups it can receive. If the devices that receive and rebroadcast the communications have a limited amount of storage, the storage of communications solely for the purpose of responding to the occasional request from another group can take a significant amount of the storage capacity of the device. This storage capacity may be needed by the device for other purposes.

What is needed is a system and method that can store communications for other groups without interfering with the storage needs of the device.

SUMMARY OF INVENTION

A system and method receives communications for various groups, timestamps and stores each communication and an identifier of the group to which the communication is directed. To make room for the received communication, other communications from the same group may be deleted depending on the characteristics of such other communications, for example in order to attempt to maintain in storage the most recent communication for many groups, though other numbers of communications for each group may be stored. Communications may be received in multiple instances, and the number of instances a communication is received is maintained.

The system and method rebroadcasts a stored communication when such a communication is requested by another device. When a communication for a group other than the group to which the receiving device corresponds is requested, the system and method also marks the communication as having been sent, in addition to rebroadcasting the communication.

When the incoming communication is received, the amount of storage available is checked to determine if the incoming communication can fit in the available storage, if any currently stored communication for the same group is first deleted or if communications from the same group having other one or more characteristics are first deleted. There may not be any such stored communication, or the incoming communication may be larger than the deleted one or more communications for the same group. If an insufficient amount of storage is available to store an incoming communication, the marked one or more communications corresponding to one or more characteristics, such as the one or more oldest marked communications, or the one or more communications indicated as having been received the most number of instances, are deleted to make room for the incoming communication, and the process repeats from the check of the amount of available storage. If sufficient storage is not available after all marked communications meeting the characteristic or characteristics have been deleted, unmarked communications for groups other than the device receiving the communication may be deleted, starting with the oldest of such communications, the one having been received the most number of instances, or one or more communications meeting other characteristics. If insufficient space is available after deleting such communications, an error is identified.

The present invention thus prioritizes communications that have already been rebroadcast in response to a request once as the lowest priority for retention, with ties being broken to delete the oldest communications, communications having been received the most number of instances, or communications received matching other characteristics first. Such a priority arrangement accommodates the fact that if two or more devices did not receive a communication, the rebroadcast in response to the first request is likely to have been received by any other device that did not receive the communication, and thus, that communication is less likely to require a subsequent rebroadcast.

DETAILED DESCRIPTION OF A PREFERRED EMBODIMENT

Figure 1:
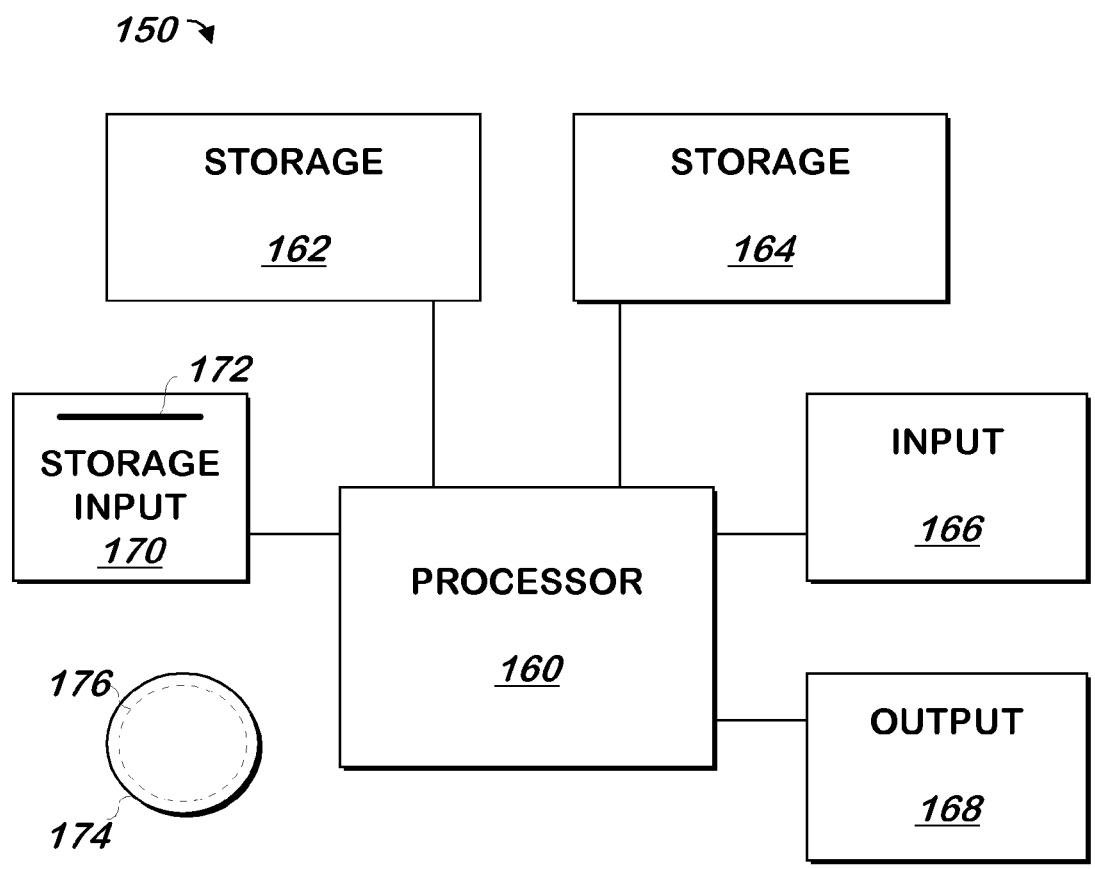
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used. In one embodiment, systems may be based on the conventional MSP430 commercially available from Texas Instruments, Inc., of Dallas, Tex., or the atmega128 commercially available from Atmel Corporation, of San Jose, Calif., or the PXA xscale commercially available from Intel Corporation of Santa Clara, Calif. Such systems may run the conventional TinyOS, commercially available from the web site of SourceForge.net or another operating system, such as a real time operating system.

Figure 2A:
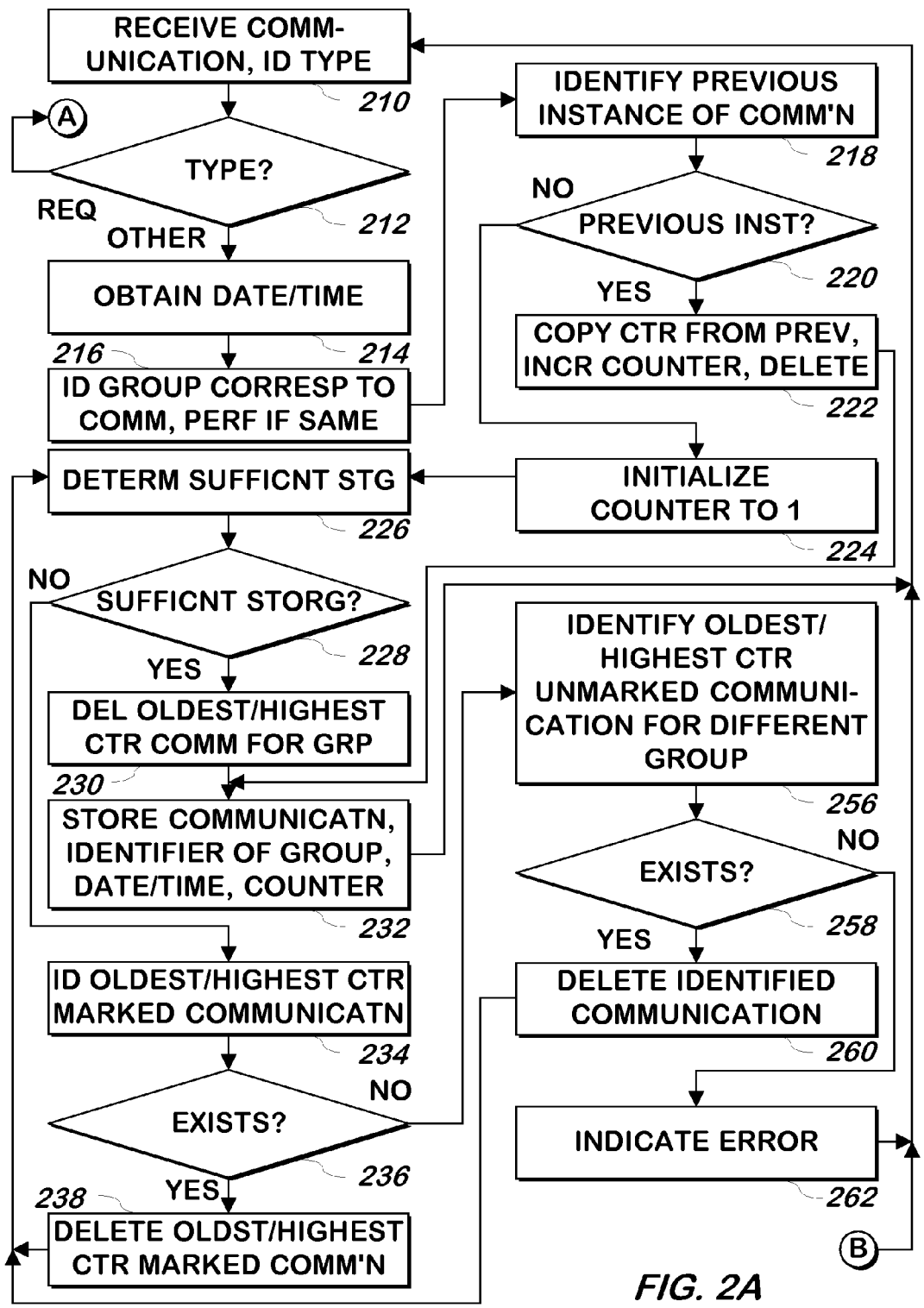
FIGS. 2A, 2B and 2C are a flowchart illustrating a method of storing and providing communications according to one embodiment of the present invention.
Figure 2B:
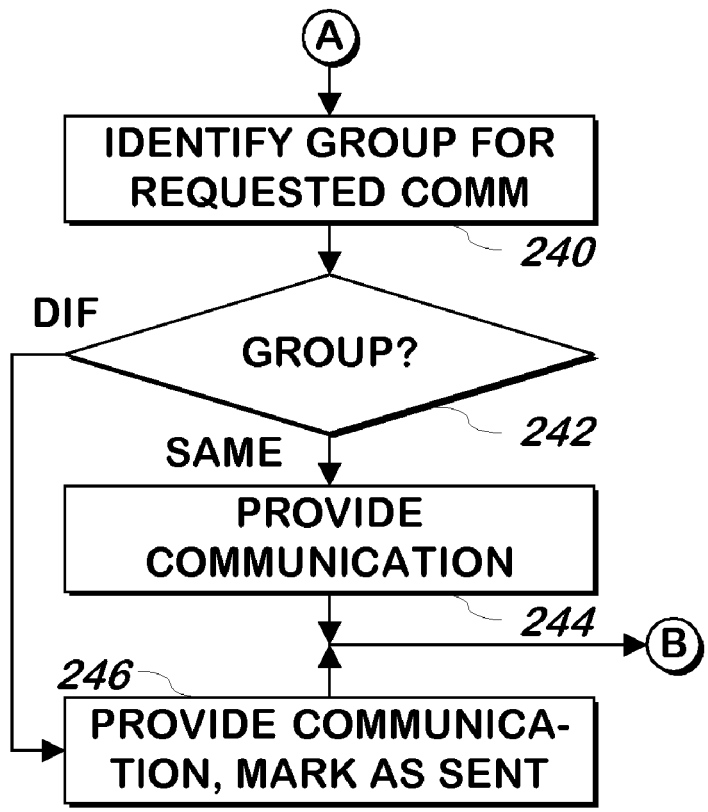
Figure 2C:
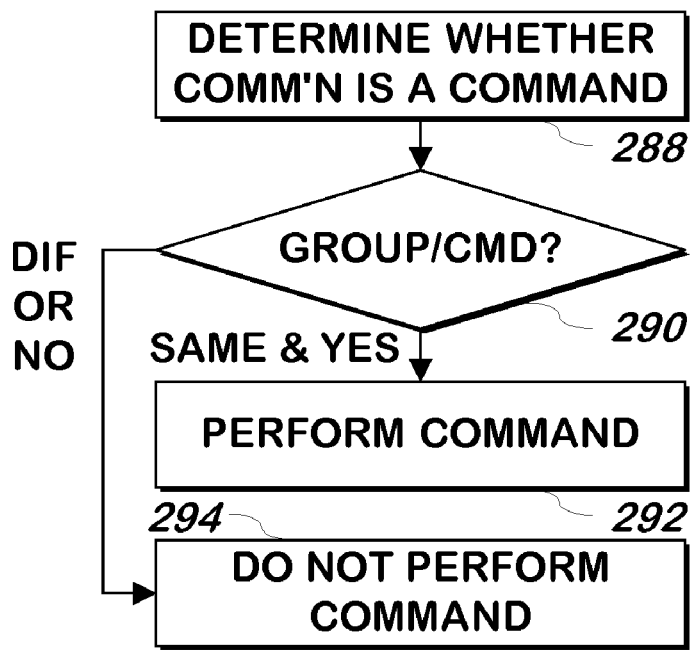

FIGS. 2A, 2B and 2C are a flowchart illustrating a method of storing and providing communications according to one embodiment of the present invention. A communication is received and a type of the communication is identified 210. In one embodiment, the communication is received wirelessly.

If the type of the communication identified in step 210 is a request to provide a previously stored communication 212, the method continues at step 240 of FIG. 2B. Otherwise 212, the message is a message that should be stored: a current date and time are obtained 214, and a group corresponding to the communication is identified 216. In one embodiment, the group corresponding to the communication may be identified via the physical channel identifier corresponding to the channel on which the communication was received, or via a group identifier or channel identifier that is included with the communication.

In one embodiment, communications that are commands are performed by the device if the command has a group identifier corresponding to one assigned to the device as part of step 216. Referring now to FIG. 2C, the performance portion of step 216 is shown in more detail according to one embodiment of the present invention. A determination is made as to whether the communication is a command capable of being performed 288. In one embodiment, all communications are commands, and step 288 is omitted. If the group of the communication corresponds to at least one group assigned to the device that received the communication and the communication is a command 290, the command is performed by the receiving device 292 and otherwise 290, the communication is not performed by the receiving device 294. The assignment of a device to a group may be made by way of another command or it may be embedded into the device at a factory.

Referring again to FIG. 2A, following step 216, step 218 is performed. A determination is made as to whether a previous instance of the communication received at step 210 is stored 218. In one embodiment, a stored communication is a previous instance of a received communication if both communications have the same sequence number included as part of the communication and optionally the same group identifier. The sequence number is a unique identifier for each group or unique for all groups, and is included as part of the communication in one embodiment.

If a previous instance of the communication is stored 220, the counter from that previous instance is copied, and incremented 222 and the previous instance is identified for deletion, freeing up storage that had been occupied by that previous instance and the method continues at step 226. Otherwise, the counter is initialized 224 and the method continues at step 226.

In one embodiment, no previous instance of any communication may be stored, as each communication is sent only one time. In such embodiment, steps 218-224 are not employed, and step 226 follows step 216.

At step 226, a determination is made as to whether sufficient storage exists after deleting any stored communication for the same group as the received communication that has a certain characteristic.

In one embodiment, only the most recent one communication for any group is stored at any given time, so there will be, at most, one communication from the same group to be deleted. The characteristic of the communication to be deleted may be that the communication is stored. Thus, if such a stored communication exists, it will be deleted. Other embodiments may allow more than one communication to be stored for any one group, for example, because the characteristic is a timestamp exceeding a certain age, and the most recently received communication for the same group does not have a timestamp that exceeds that age. Determination of which communications to delete can be of any complexity.

In one embodiment, the characteristic any communications from the same group will meet to be deleted is a timestamp that is the earliest, or one of the earliest among any other timestamps stored with any other stored communication for the same group as the received communication. In another embodiment, the characteristic is a counter that is the largest or one of the largest among the counters stored with any other stored communication for the same group as the received communication. Other criteria may be used to select the communication for deletion. For example, of the communications with the top 3 largest counters, one may be selected for deletion at random or pseudo randomly, to minimize the possibility that neighboring devices will each delete the same stored communication upon receipt of another communication in the same group. In one embodiment, only one communication is identified in this manner, and in another embodiment, there may be multiple communications, as the characteristic may include communications having a counter value or age that exceeds a threshold. In still another embodiment, a function combining the timestamp, the current date and time, and number of times the communication was received may be used to select the communication or communications for deletion.

If sufficient storage exists to store the communication after deleting any currently stored communication for the group identified as described above and herein 228, any such communication that is stored for the group corresponding to the communication received in step 210 and identified as described above, including a previous instance or a different communication, is deleted 230, and the communication received in step 210 is stored 232 along with an identifier of the group corresponding to that communication, the counter, and the date and time obtained in step 214, and the method continues at step 210.

It is noted that there may not be sufficient storage to store an incoming communication. This may be because there is less storage than would be required to store the most recent communications from each group. This may occur in spite of the fact that a previous communication is stored for the same group, and will be deleted before the newly-received communication is stored, because the newly-received communication may be larger than the one previously stored.

If there is insufficient storage available to store the communication after deleting any currently stored communication for the group corresponding to the communication identified as described above 238, an attempt is made 234 to identify one or more communications that are marked in the manner described herein and meets one or more characteristics, such as any of those described above. The characteristic or characteristic may be the same or different from any of those actually used as described above. For example, the oldest one or more marked communications may be identified, or one or more communications with the highest counter values may be identified for deletion. If such a communication or communications exist 236, such marked communication or communications are deleted 238 and the method continues at step 238. The marked communication(s) deleted may include any marked, or only those from groups different from that of the received communication. It is noted that, although for the sake of illustration the identification of communications to delete and their deletion are shown as an iterative process that may repeat until there is sufficient storage available, in one embodiment rather than repeating e.g. steps 238 through 238 until sufficient storage is made available, the determination of how many and which communications to delete is made as part of step 238, and multiple marked communications would be deleted as part of step 238, as one of the characteristics would be the total size of the deleted communications are up to at least as large as the space needed to store the received communication. The function of steps 256-260, described below, can similarly be performed in a single pass rather than iteratively as shown in this embodiment.

If no such marked communication exists, for example, because there are no marked communications or no marked communications that meet the criteria 236, the method continues at step 256.

At step 256, an attempt is made to identify any unmarked communication or communications for one or more groups different from the group corresponding to the device receiving the message that have one or more characteristics, such as any of those described herein. For example, the characteristic may be the oldest one or more communications or the one or more with the highest counter value or values. The characteristics used at step 256 may be the same or different from those actually used as described above. If such one or more communications exists in storage 258, the identified communication or communications are deleted 260 and the method continues at step 238. If no such communication exists in storage 258, an error is indicated 262 and the method continues at step 210.

As noted above, the communication received at step 210 may be a request to provide a stored communication. At step 212, if the type of the communication is such a request, the method continues at step 240 of FIG. 2B.

Referring now to FIG. 2B, at step 240, the group corresponding to the requested communication is identified and compared to the group corresponding to the device that received the request. The group corresponding to the requested communication may be identified explicitly in the communication, or it may be inferred from the logical or physical channel used to receive the communication. If that group is the same as the group of the device receiving the request 242, the communication is provided 244, and the method continues at step 210. The communication provided may be implied from the request (e.g. the most recent communication corresponding to the group corresponding to the requested communication) or it may be specified, for example, using a sequence number corresponding to a communication for that group.

If the group is different from the group of the device receiving the request 242, the communication is provided and marked as having been sent 246, and the method continues at step 210 of FIG. 2A.

In one embodiment, in addition to, or instead of, marking the communication as having been sent, a counter corresponding to the stored communication is maintained and the counter is incremented each time the communication is sent. The value of that counter may be one of the characteristics used as described herein.

System

Figure 3:
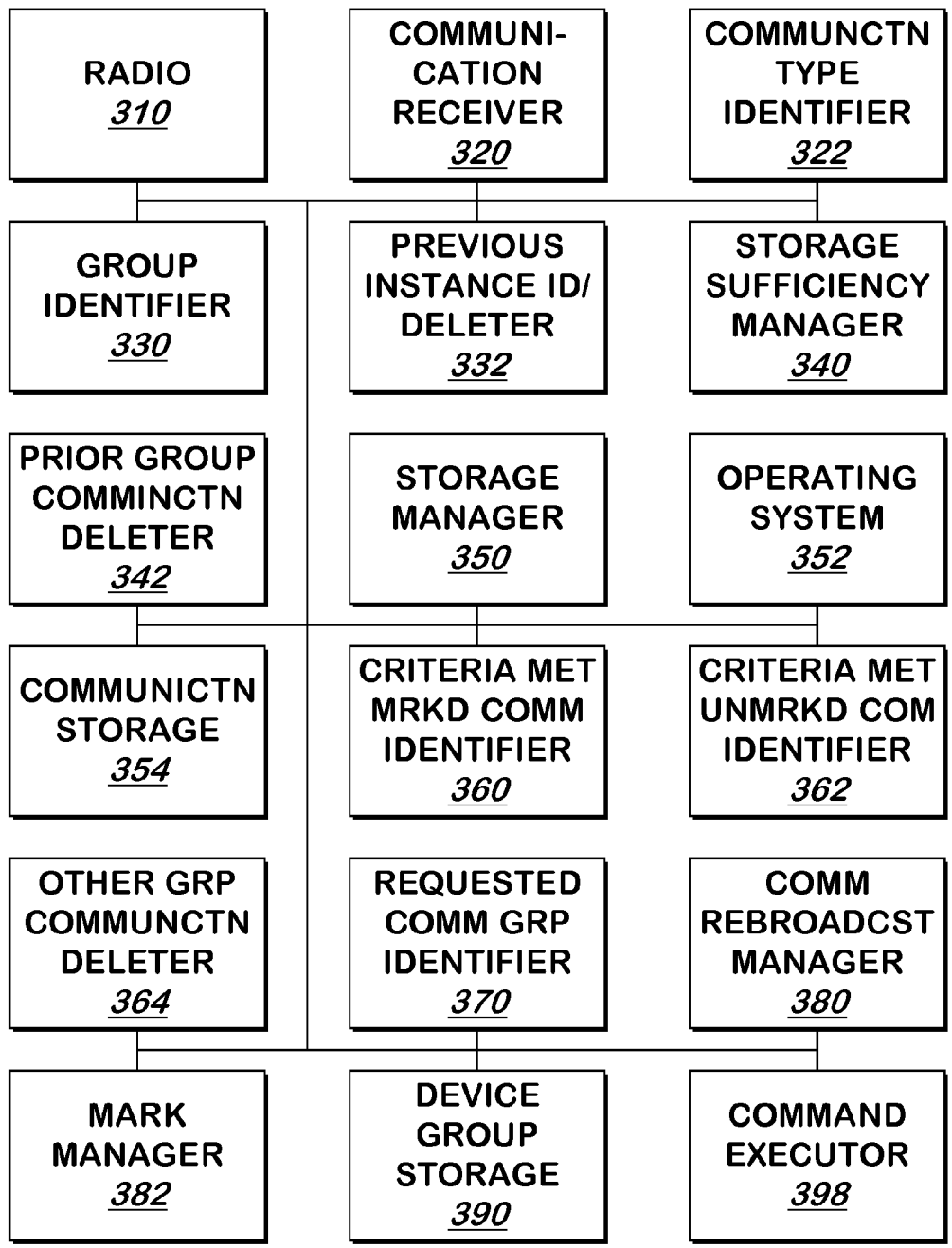
FIG. 3 is a block schematic diagram of a system for storing and providing communications according to one embodiment of the present invention.

FIG. 3 is a block schematic diagram of a system for storing and providing communications according to one embodiment of the present invention. Referring now to FIG. 3, at any time, communication receiver 320 may receive a communication via radio 310, for example from one of any number of devices (not shown), any number of which may operate in a manner at least similar to the system shown. In one embodiment, radio 310 is a conventional IEEE 802.15.x-compatible radio that provides some or all of the capabilities described by one or more 802.15.x specifications, and that transmits and receives data over a wireless network, though wired networks may also be used. Other radios and/or protocols may be used, such as the conventional 802.11a/b/g/h or other similar protocols. When communication receiver 320 receives the communication, communication receiver 320 provides the communication to communication type identifier 322, in one embodiment along with an identifier of the channel on which the communication was received.

When communication type identifier 322 receives the communication and any channel identifier, communication type identifier 322 parses the communication to identify its type. If the communication is a request to provide a communication, communication type identifier 322 provides the communication and any channel identifier to requested communication group identifier 370, which proceeds as described herein and below. Otherwise, if the communication is not a request, communication type identifier 322 provides the communication and the channel identifier to group identifier 330.

When group identifier 330 receives the communication and the channel identifier, group identifier 330 requests and receives a current date and time from operating system 352, and timestamps the communication. Group identifier 330 also determines the group to which the communication corresponds. In one embodiment, the channel identifier also identifies the group corresponding to the communication. In another embodiment, group identifier 330 may use a group identifier that is included with the communication to identify the group of the communication. Group identifier 330 adds the communication, the timestamp and the identifier of the group to a communication record, and stores the communication record in communication storage 354 on a temporary basis.

Group identifier 330 also determines whether the communication corresponds to a group to which the device in which group identifier 330 resides also corresponds. In one embodiment, an identifier of the group corresponding to the device in which group identifier 330 resides is received and stored by device group storage 390, for example from a system administrator, and group identifier 330 finds that group identifier in device group storage 390. In one embodiment, device group storage 390 includes conventional disk storage or memory.

If the communication corresponds to the same group as the device, group identifier 330 provides a pointer to the communication record to command executor 398, and also provides the pointer to the communication record to previous instance identifier/deleter 332. Otherwise, group identifier 330 provides the pointer to the communication record to previous instance identifier/deleter 332, which proceeds as described herein and below.

When command executor 398 receives the pointer to the communication record, in one embodiment command executor 398 parses the communication to determine whether it is a command capable of being performed by the device in which command executor 398 corresponds. If so, command executor 398 performs the command. Otherwise, in one embodiment command executor 398 takes no action until another communication is received.

When previous instance identifier/deleter 332 receives the pointer to the communication record from group identifier 330 as described herein and above, previous instance identifier/deleter 332 checks communication storage 354 to determine whether a previous instance of the communication corresponding to the record is stored. In one embodiment, communication storage 354 includes conventional memory or disk storage. In one embodiment, each stored communication in communication storage 354 is associated with the identifier of the group to which that communication corresponds, the timestamp indicating the last time an instance of that communication was received, and a counter indicating the number of times the communication record was received. In one embodiment, each communication includes a sequence number, and a stored communication is a previous instance of a received communication if both communications have the same sequence number and are associated with the same group identifier. If identifier/deleter 332 finds a previous instance of the received communication stored in communication storage 354, identifier/deleter 332 copies the timestamp indicating when that instance was initially received and the counter associated with the previous instance, and increments that counter by one. In one embodiment, identifier/deleter 332 then deletes the previously stored communication along with the information associated with that communication, and instead stores the newly received communication in communication storage 354, associated with the incremented counter, the received group identifier, and the timestamp copied as described above.

If identifier/deleter 332 does not find a previous instance of the received communication stored in communication storage 354, identifier/deleter 332 initializes a counter in the communication record. In one embodiment, the initialized counter is set equal to one. Identifier/deleter 332 also initializes a mark in the communication record to zero. Identifier/deleter 332 provides the pointer to the communication record to storage manager 350.

When storage manager 350 receives the pointer, storage manager 350 determines the size of the communication record, and places an indication of the size of the communication record (including the indication) in the record. Storage manager 350 provides the pointer to storage sufficiency manager 340.

When storage sufficiency manager 340 receives the pointer to the communication record, storage sufficiency manager 340 determines whether sufficient storage is available in a permanent area of communication storage 354 to store the communication record, after one or more communication records including the same group identifier, and matching one or more predetermined criteria, are deleted from that permanent area of communication storage 354. In one embodiment, there is at most only one stored communication record with the same group identifier as the one in the new communication record, and if such a communication record is stored, it is identified as the communication record to be deleted. As described herein and above, in another embodiment, the criteria for deletion is a timestamp that is the or one of the earliest among any other timestamps included in any other stored communication records corresponding to the same group as the new communication record; that is, the oldest communications are deleted first. In another embodiment, the characteristic is a counter that is the largest or one of the largest among the counters included in any other stored communication records corresponding to the same group as the new communication record; that is, the communications most commonly received are deleted first. Additional or alternative criteria for deletion may be used in other embodiments. Storage sufficiency manager 340 provides storage manager 350 with an indication of whether or not sufficient storage would be available if the communication record or records identified as described above were deleted. If insufficient storage would be available, storage sufficiency manager 340 also provides storage manager 350 with the size of the storage that would be available after the identified communication record(s) were deleted.

If storage manager 350 receives the indication that sufficient storage is available, storage manager 350 provides the group identifier to prior group communication deleter 342, and prior group communication deleter 342 deletes the one or more communication records including the same group identifier, and having the predetermined characteristic(s) as described herein and above, from communication storage 354. When prior group communication deleter 342 has deleted that communication record or records, or if prior group communication deleter 342 determines that no communication records including that group identifier are stored, prior group communication deleter 342 signals storage manager 350, and storage manager 350 stores the communication record in a permanent area of communication storage 354. In one embodiment, the system takes no further action until a new communication is received by communication receiver 320 as described herein and above.

Otherwise, if storage manager 350 receives the indication that insufficient storage is available along with the available storage size, storage manager 350 compares the communication record size to the available storage size in order to determine the amount of additional storage that will be required to store the communication record. If the amount of storage required is greater than the total amount of storage in communication storage 354, storage manager 350 determines that the communication record cannot be stored, and in one embodiment discards the communication record. Otherwise, storage manager 350 provides the amount of storage required to criteria met marked communication identifier 360.

When criteria met marked communication identifier 360 receives the amount of storage required, criteria met marked communication identifier 360 identifies the amount of storage that can be freed in communication storage 354 by deleting some or all communications that may be marked as described in more detail herein and below. Criteria met marked communication identifier 360 flags a number of marked communications in communication storage 354 for deletion, proceeding in order of the degree to which the communications meet the criteria for deletion. For example, if the criteria for deletion is age, in one embodiment criteria met marked communication identifier 360 marks the oldest such communication (as indicated by the timestamp included in the communication) and proceeds chronologically until enough communications have been flagged for deletion to free up the amount of storage required or until all marked communications have been flagged. Similarly, if the criteria for deletion is for example counter value, criteria met marked communication identifier 360 marks the communication with the highest counter value or the first of any such communications with the highest counter value, and proceeds in descending order of counter value until enough communications have been flagged for deletion to free up the amount of storage required or until all marked communications have been flagged. When criteria met marked communication identifier 360 has flagged the communications, criteria met marked communication identifier 360 provides storage manager 350 with an indication of the amount of storage that can be freed if all the marked communications are deleted.

When storage manager 350 receives such an indication, storage manager 350 compares the amount of storage that can be freed by deleting marked communications with the amount of storage required, in order to determine the amount of additional storage required. If no additional storage is required, storage manager 350 signals other group communication deleter 364.

When so signaled, other group communication deleter 364 deletes the flagged communications. When other group communication deleter 364 has deleted the flagged communications, other group communication deleter 364 signals storage manager 350.

When so signaled, storage manager 350 stores the communication record in the permanent area of communication storage 354. In one embodiment, the system takes no further action until a new communication is received by communication receiver 320 as described herein and above.

As described herein and above, criteria met marked communication identifier 360 may indicate that the amount of storage that can be freed by deleting marked communications is less than the amount of storage required. If storage manager determines additional storage, beyond that which would be freed if all of the marked communications were deleted, is required to store the communication record, storage manager 350 provides the amount of additional storage required to criteria met unmarked communication identifier 362.

When criteria met unmarked communication identifier 362 receives the amount of additional storage required, criteria met unmarked communication identifier 362 finds the group identifier stored in device group storage 390, and identifies the amount of storage that can be freed in communication storage 354 by deleting unmarked communications associated with group identifiers other than that group identifier.

If criteria met unmarked communication identifier 362 determines that the amount of storage that can be freed in communication storage 354 by deleting communications associated with groups other than the group identified in device group storage 390 is less than the amount of additional storage required, criteria met unmarked communication identifier 362 unmarks the communications marked as described above, and so indicates to storage manager 350. In one embodiment, when storage manager 350 receives such an indication, storage manager 350 determines that the communication cannot be stored, and discards the communication and associated information.

Otherwise, if criteria met unmarked communication identifier 362 determines that the amount of storage that can be so freed is equal to or greater than the amount of additional storage required, criteria met unmarked communication identifier 362 flags for deletion in communication storage 354 a number of unmarked communications associated with group identifiers other than the group identifier stored in device group storage 390, proceeding in order of the degree to which those communications meet the criteria for deletion as described herein and above, until enough communications have been flagged for deletion to free up the amount of additional storage required. When criteria met unmarked communication identifier 362 has flagged such communications, criteria met unmarked communication identifier 362 signals other group communication deleter 364.

When so signaled, other group communication deleter 364 deletes the flagged communications. When other group communication deleter 364 has deleted the flagged communications, other group communication deleter 364 signals storage manager 350.

When so signaled, storage manager 350 stores the timestamped communication, associated with the group identifier and the counter, in the permanent area of communication storage 354. In one embodiment, the system takes no further action until a new communication is received by communication receiver 320 as described herein and above.

As described herein and above, if communication type identifier 322 determines that the communication is a request, communication type identifier 322 provides the request to requested communication group identifier 370 along with any channel identifier. When requested communication group identifier 370 receives the request and any channel identifier, requested communication group identifier 370 identifies the group to which the requested communication corresponds, as described herein and above. When requested communication group identifier 370 has identified the group to which the requested communication corresponds, requested communication group identifier 370 provides the group identifier to communication rebroadcast manager 380, which proceeds as described herein and below. Requested communication group identifier 370 also checks the group identifier stored in device group storage 390 in order to determine whether the requested communication corresponds to the same group as the device in which requested communication group identifier 370 resides. If the groups are not the same, requested communication group identifier 370 provides the identifier of the group to which the requested communication corresponds to mark manager 382, which proceeds as described herein and below.

In the embodiment that more than one communication for each group is stored at any given time, requested communication group identifier 370 also identifies the communication requested. As described herein and above, each communication may for example be identified by the sequence number and group identifier of the communication, and in one embodiment, the sequence number of any requested communication may be included in the request. Other techniques for identifying requested communications may be used in other embodiments. In this embodiment, in addition to providing the group identifier to mark manager 382 and/or communication rebroadcast manager 380, requested communication group identifier 370 also provides the sequence number of the requested communication.

When communication rebroadcast manager 380 receives the group identifier and optionally the sequence number, communication rebroadcast manager 380 finds the communication in communication storage 354 corresponding to that group and including that sequence number, if one was received, and communication rebroadcast manager 380 broadcasts that communication via radio 310. If no such communication is stored in communication storage 354, in one embodiment communication rebroadcast manager 380 takes no further action to broadcast the communication.

When mark manager 382 receives the group identifier and optionally the sequence number as described herein and above, mark manager 382 finds the communication in communication storage 354 corresponding to that group and including that sequence number, if one was received, and marks that communication. If no such communication is stored in communication storage 354, in one embodiment mark manager 382 takes no further action to mark the communication.

Summary

There has been disclosed:

A method of, and computer program product for, storing a communication, including wirelessly receiving the communication, identifying a group corresponding to the communication, determining whether sufficient storage exists to store the communication or does not exist to store the communication, provided that at least zero stored communications corresponding to the group identified are deleted, responsive to a determination that sufficient storage does not exist to store the communication, identifying at least zero stored communications that have been wirelessly provided by a device that received the communication in response to at least one request to provide such a stored communication, and that correspond to at least one first characteristic, responsive to the at least zero stored communications comprising at least one stored communication, deleting the at least one stored communication identified; and storing the communication received and the group identified.

There is an optional feature, whereby at least one of the at least one first characteristic is related to a time of receipt of each of the at least zero stored communications that have been wirelessly provided.

There is an optional feature, whereby at least one of the at least one first characteristic is related to a number of times an instance of each of the at least zero stored communications that have been wirelessly provided was received.

Optionally, the method and computer program product additionally include, responsive to a size of the communication received exceeding a size of the at least zero stored communications identified, identifying at least one stored communication that has not been wirelessly provided by the device that received the communication in response to at least one request to provide such at least one stored communication and that correspond to at least one second characteristic, and deleting the at least one stored communication that has not been wirelessly provided by the device that received the communication identified before the storing step.

There is an optional feature, whereby at least one of the at least one second characteristic is related to a time of receipt of each of the at least zero stored communications that have been wirelessly provided.

There is an optional feature, whereby at least one of the at least one second characteristic is related to a number of times an instance of each of the at least zero stored communications that have been wirelessly provided was received.

There is an optional feature, whereby the at least zero stored communications corresponding to the group comprises at least one stored communications corresponding to the group; and the method and computer program product may additionally include deleting the at least one stored communication corresponding to the group.

There has been disclosed a system for storing a communication, including a communication receiver having an input operatively coupled for receiving the communication from a wireless radio, the communication receiver for providing the communication at an output, the communication comprising an indication of a group, a group identifier having an input coupled to the communication receiver output, the group identifier for identifying the group to which the indication corresponds and for providing at an output an identifier of the group, a storage sufficiency manager having a communication input coupled to the communication receiver output for receiving the communication and a group input coupled to the group identifier output for receiving the identifier of the group, the storage sufficiency manager for determining whether sufficient storage exists in at least a portion of a storage device coupled to an input/output to store the communication or does not exist in the at least the portion of the storage device to store the communication, provided that at least zero stored communications corresponding to the group identifier received at the group input are deleted and for providing at an output an indication related to whether said sufficient storage exists in the at least the portion of the storage device, a marked communication identifier having an input coupled to the storage sufficiency manager output for receiving the indication, the marked communication identifier for, responsive to the indication indicating that sufficient storage does not exist to store the communication in the at least the portion of the storage device, providing at an output a first identification of at least zero stored communications stored in the at least the portion of the storage device that have been wirelessly provided by a device comprising the system in response to at least one request to provide such a stored communication; and that correspond to at least one first characteristic, an other group communication deleter having an input coupled to the marked communication identifier output for receiving the first identification of at least zero stored communications stored in the at least the portion of the storage device, the other group communication deleter for, responsive to the at least zero stored communications comprising at least one stored communication, deleting via a first output coupled to the at least the portion of the storage device the at least one stored communication corresponding to the first identification and providing a signal at a second output; and a storage manager having a first input coupled to the storage sufficiency manager output for receiving the indication, a second input coupled to the other group communication deleter for receiving the signal, a third input coupled to the communication receiver output for receiving the communication received, and a fourth input coupled to the group identifier for receiving the identifier of the group, the storage manager for, responsive to receipt of the signal or receipt of the indication indicating that sufficient storage does not exist to store the communication in the at least the portion of the storage device, storing via an output the communication received and the group identified in the at least the portion of the storage device.

There is an optional feature, whereby at least one of the at least one first characteristic is related to a time of receipt of each of the at least zero stored communications that have been wirelessly provided.

There is an optional feature, whereby at least one of the at least one first characteristic is related to a number of times an instance of each of the at least zero stored communications that have been wirelessly provided was received.

There is an optional feature, whereby the storage sufficiency manager is additionally for identifying a shortfall amount of storage in the storage device, provided that at least zero stored communications corresponding to the group identifier received at the group input are deleted, the indication provided at the storage sufficiency manager output comprises the shortfall amount, the marked communication identifier is additionally for determining whether an amount of storage corresponding to the at least zero communications identified is not as large as the shortfall amount, and for providing a notice responsive to the determination, and the system additionally may include an unmarked communication identifier having an input coupled to the marked communication identifier output, the unmarked communication identifier for, responsive to the notice, providing at an output a second identification of at least one stored communications stored in the at least the portion of the storage device that have not been wirelessly provided by a device comprising the system in response to at least one request to provide such a stored communication, and that correspond to at least one second characteristic; and there is an optional feature, whereby the other group communication deleter input is coupled to the unmarked communication identifier output for additionally receiving the second identification of the at least one stored communications stored in the at least the portion of the storage device, the other group communication deleter additionally for deleting via the first output coupled to the at least the portion of the storage device the at least one stored communication corresponding to the second identification.

There is an optional feature, whereby at least one of the at least one second characteristic is related to a time of receipt of each of the at least zero stored communications that have been wirelessly provided.

There is an optional feature, whereby at least one of the at least one second characteristic is related to a number of times an instance of each of the at least zero stored communications that have been wirelessly provided was received.

There is an optional feature, whereby the at least zero stored communications corresponding to the group comprises at least one stored communications corresponding to the group, and the system additionally includes a prior group communication deleter having an input coupled to the group identifier output for receiving the group identifier, the prior group communication deleter for deleting, via an input/output coupled to the at least the portion of the storage device, the at least one stored communication corresponding to the group.

What is claimed is:

1. A method of enabling a wireless device to exchange communications addressed to a group using a group identifier in a sequence of transmissions, the method comprising:
   wirelessly receiving a first communication addressed to a group of wireless devices;
   identifying a group identifier corresponding to the communication;
   determining whether a set of stored communications stored in a storage module include the group identifier;
   responsive to a determination that the set of stored communications include the group identifier, increasing a counter associated with each of the stored communications in the set by one;
   determining whether sufficient storage exists in the storage module to store the first communication; and
   responsive to a determination that sufficient storage does not exist in the storage module to store the first communication:
   identifying a subset of communications in the set of stored communications that have the greatest counter value,
   selecting a second communication from the subset of the communications,
   deleting the second communication, and
   storing the first communication.

2. The method of claim 1 wherein the second communication is randomly selected.

3. The method of claim 1 wherein the second communication is selected using a time of receipt.

4. The method of claim 1 wherein the second communication is selected using a number of times an instance of the second communication was received.

5. The method of claim 1, additionally comprising, responsive to a size of the first communication received exceeding a size of the second communication:
   identifying a third communication that has not been wirelessly provided by the device that received the communication in response to at least one request to provide such at least one stored communication and that correspond to at least one second characteristic; and deleting the third communication that has not been wirelessly provided by the device before the storing step.

6. The method of claim 5 wherein the at least one second characteristic is related to a time of receipt.

7. The method of claim 5 wherein the at least one second characteristic is related to a number of times an instance of the second communication that have been wirelessly provided was received.

8. The method of claim 1:
wherein the second communication comprises at least one stored communications corresponding to the group; and
additionally comprising deleting the second communication corresponding to the group.

9. A system configured to enable a wireless device to exchange communications addressed to a group using a group identifier in a sequence of transmissions, the system comprising:
a processor; and
instructions that when executed on the processor cause the processor to perform operations that include:
wirelessly receiving a first communication addressed to a group of wireless devices;
identifying a group identifier corresponding to the communication;
determining whether a set of stored communications stored in a storage module include the group identifier;
responsive to a determination that the set of stored communications include the group identifier, increasing a counter associated with each of the stored communications in the set by one;
determining whether sufficient storage exists in the storage module to store the first communication; and
responsive to a determination that sufficient storage does not exist in the storage module to store the first communication:
identifying a subset of communications in the set of stored communications that have the greatest counter value,
selecting a second communication from the subset of the communications,
deleting the second communication, and
storing the first communication.

10. The system of claim 9 wherein the second communication is randomly selected.

11. The system of claim 9 wherein the second communication is identified using a time of receipt.

12. The system of claim 9 wherein the second communication is identified using a number of times an instance of the second communication was received.

13. The system of claim 9 additionally comprising, responsive to a size of the first communication received exceeding a size of the second communication:
identifying a third communication that has not been wirelessly provided by the device that received the communication in response to at least one request to provide such at least one stored communication and that correspond to at least one second characteristic; and
deleting the third communication that has not been wirelessly provided by the device before the storing.

14. The system of claim 13 wherein the at least one second characteristic is related to a time of receipt.

15. The system of claim 13 wherein the at least one second characteristic is related to a number of times an instance of the second communication that have been wirelessly provided was received.

16. The system of claim 9:
wherein the second communication comprises at least one stored communications corresponding to the group; and
additionally comprising deleting the second communication corresponding to the group.

17. A computer program stored on a non-transitory computer readable medium configured to enable a wireless device to exchange communications addressed to a group using a group identifier in a sequence of transmissions, the computer program comprising:
instructions that when executed on a processor cause the processor to perform operations that include:
wirelessly receiving a first communication addressed to a group of wireless devices;
identifying a group identifier corresponding to the communication;
determining whether a set of stored communications stored in a storage module include the group identifier;
responsive to a determination that the set of stored communications include the group identifier, increasing a counter associated with each of the stored communications in the set by one;
determining whether sufficient storage exists in the storage module to store the first communication; and
responsive to a determination that sufficient storage does not exist in the storage module to store the first communication:
identifying a subset of communications in the set of stored communications that have the greatest counter value,
selecting a second communication from the subset of the communications,
deleting the second communication, and
storing the first communication.

18. The computer program of claim 17 wherein the second communication is randomly selected.

19. The computer program of claim 17 additionally comprising, responsive to a size of the first communication received exceeding a size of the second communication:
identifying a third communication that has not been wirelessly provided by the device that received the communication in response to at least one request to provide such at least one stored communication and that correspond to at least one second characteristic; and
deleting the third communication that has not been wirelessly provided by the device before the storing.

20. The computer program of claim 17:
wherein the second communication comprises at least one stored communications corresponding to the group; and
additionally comprising deleting the second communication corresponding to the group.

* * * * *